May 12, 1959   C. W. ROSE ET AL   2,886,227
LADDER CLIMBER
Filed July 25, 1955   3 Sheets-Sheet 1
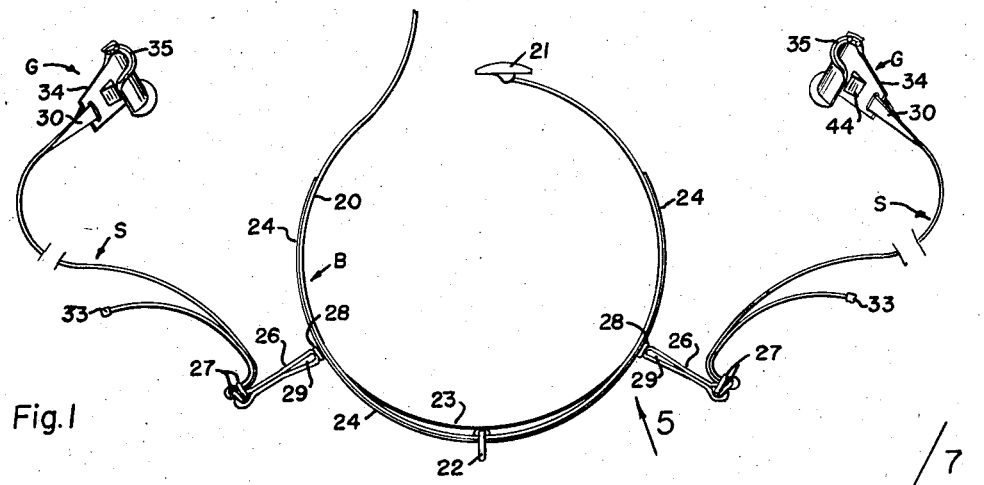
Fig. 1
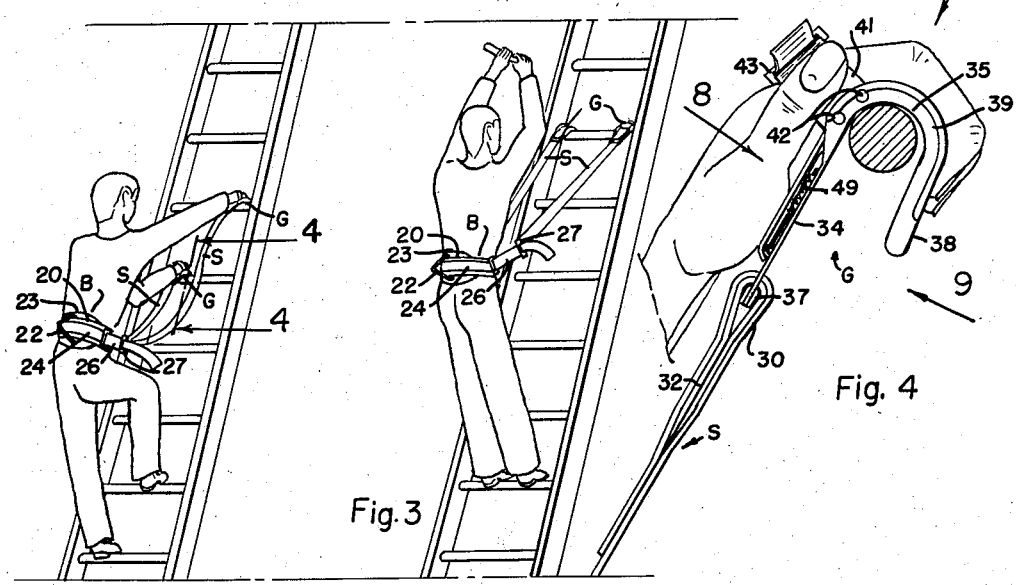
Fig. 2   Fig. 3   Fig. 4
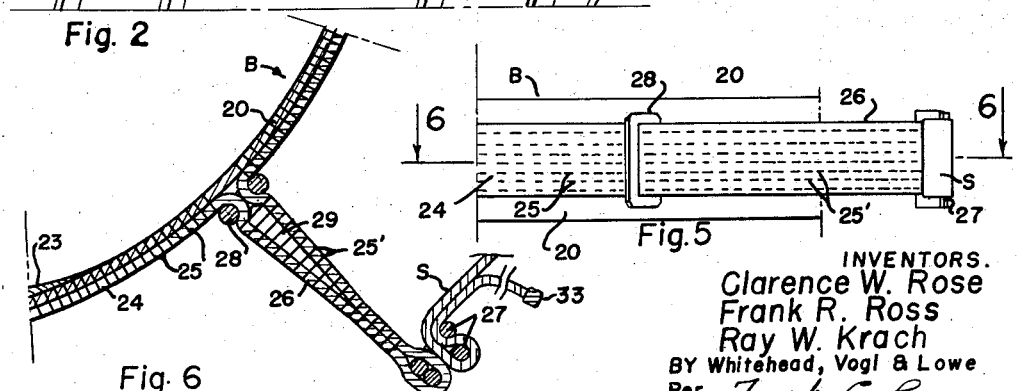
Fig. 5
Fig. 6
INVENTORS.
Clarence W. Rose
Frank R. Ross
Ray W. Krach
BY Whitehead, Vogl & Lowe
Per Frank C. Lowe
ATTORNEYS

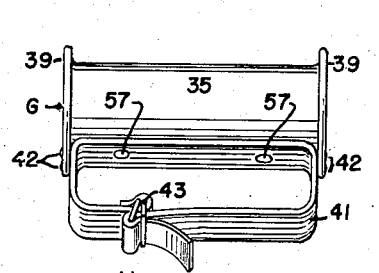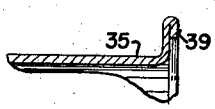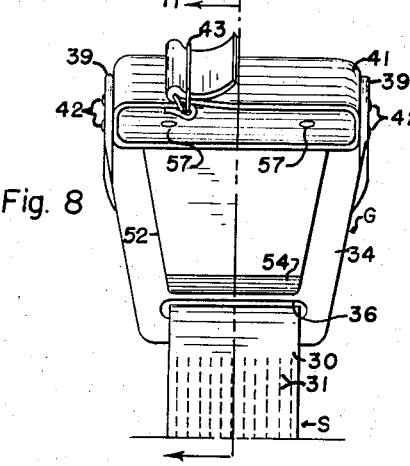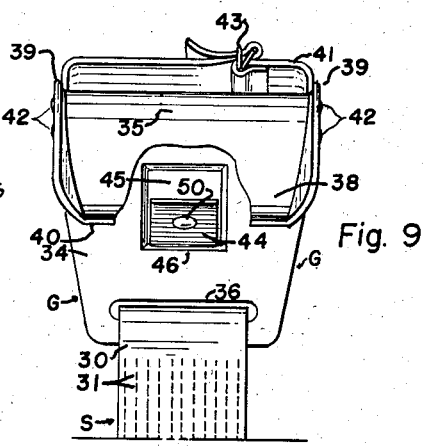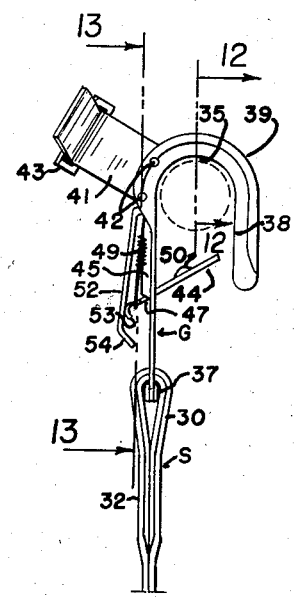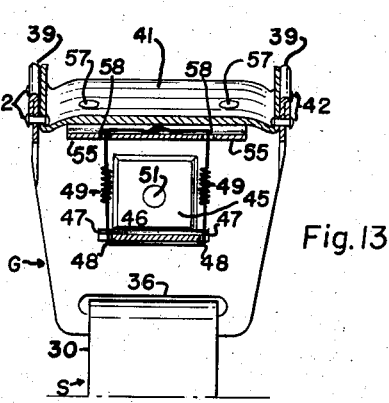

May 12, 1959  C. W. ROSE ET AL  2,886,227
LADDER CLIMBER
Filed July 25, 1955  3 Sheets-Sheet 3
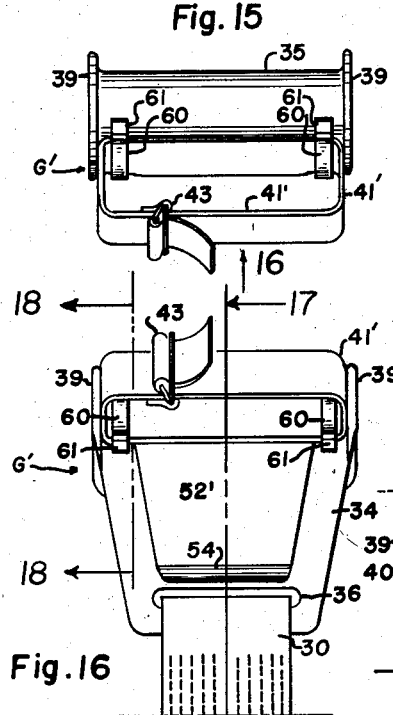
Fig. 15
Fig. 16
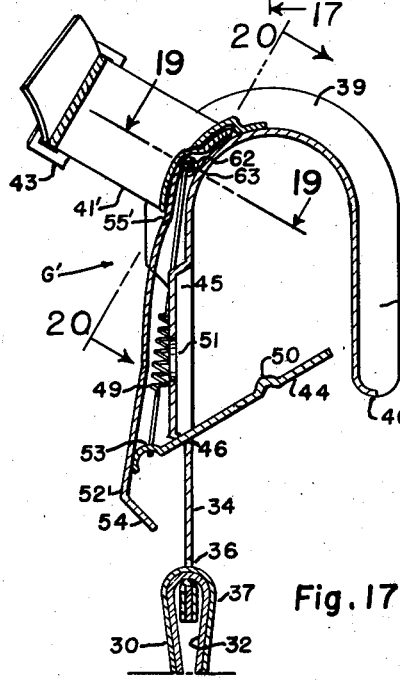
Fig. 17
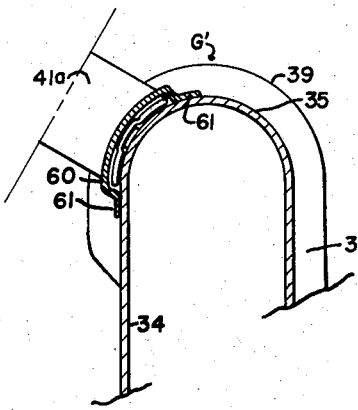
Fig. 18
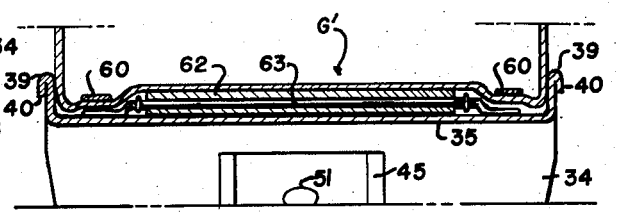
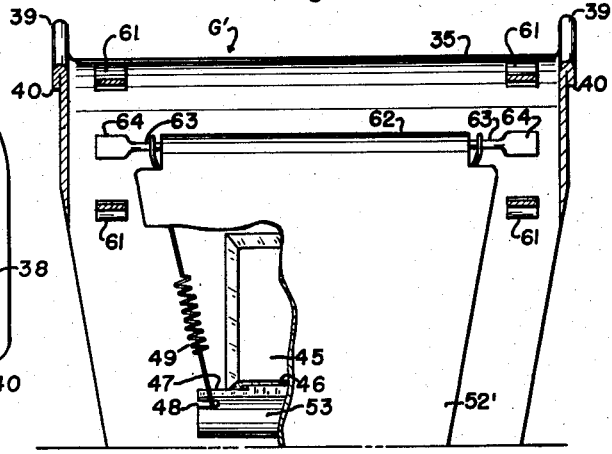
Fig. 19
Fig. 20
INVENTORS.
Clarence W. Rose
Frank R. Ross
Ray W. Krach
BY Whitehead, Vogl & Lowe
Per  Frank C. Lowe
ATTORNEYS

United States Patent Office 2,886,227
Patented May 12, 1959

2,886,227
LADDER CLIMBER

Clarence W. Rose, Ray W. Krach, and Frank R. Ross, Denver, Colo., assignors to Rose Manufacturing Company, a corporation of Colorado Application July 25, 1955, Serial No. 523,952

8 Claims. (Cl. 227—25)

This invention relates to safety equipment and apparatus, and more particularly to that class of safety apparatus which is worn and used by workmen in high places as a precaution against injury from an accidental fall. A primary object of the invention is to provide novel and improved safety apparatus which is primarily for use in connection with ladder work, and the invention includes as a paramount feature, improved means for gripping the rungs of a ladder. As such, the invention will be hereinafter referred to as a ladder climber.

Other objects of the invention are to provide a novel and improved safety ladder-climber which (a) safeguards an individual against injury from falling while climbing a ladder, which might occur as the result of slipping, fainting or the like; (b) supplements an individual's grip upon the rungs of a ladder and thereby provides security and assistance in climbing a ladder where the rungs are wet, icy or otherwise slippery and dangerous, or where the climb is so great that the individual might become weary; (c) is also adapted to secure an individual to a ladder whereon he has to work while standing upon the ladder and is further adapted to automatically latch and to be non-releasable when the individual's hand grip is not purposely releasing the apparatus by hand pressure or squeezing; (d) greatly facilitates the ability of a workman to climb a ladder and to reach and work upon objects while remaining upon the ladder; (e) permits a worker to be safely secured to any horizontally disposed member, such as a pipe or bar similar in size to a ladder rung; (f) is adapted to be used in connection with or as an accessory to conventional types of safety belts and is especially adapted to be used in combination with an improved form of safety belt and this combination constitutes an improved safety ladder-climbing apparatus; (g) is a simple, strong, neat appearing, versatile, economical and durable safety apparatus.

With the foregoing and other objects in view, all of which are more fully hereinafter disclosed, this invention comprises certain novel and improved constructions, combinations and arrangements of parts and elements as hereinafter described and as defined in the appended claims and illustrated in preferred embodiments in the accompanying drawing, in which:

Figure 1 is a plan view of the improved safety ladder climbing apparatus including an improved belt construction associated with ladder gripping elements which are strap connected thereto;

Figure 2 illustrates an individual wearing the apparatus and climbing a ladder;

Figure 3 illustrates the individual with the apparatus adjusted to permit him to be safely supported while standing upon the ladder with his hands free for working;

Figure 4 is a side elevation view of a gripper unit as being held upon a ladder rung, as taken substantially from the indicated line 4—4 at Fig. 2, but on a greatly enlarged scale;

Figure 5 is a fragmentary portion of the belt construction as viewed from the indicated arrow 5 at Fig. 1, but on a greatly enlarged scale;

Figure 6 is a sectional detail as taken from the indicated line 6—6 at Fig. 5;

Figure 7 is a top view of the gripper unit per se as from the indicated arrow 7 at Fig. 4;

Figure 8 is an elevation view of the outer face of the gripper whereon an operator's hand would lie, as taken from the indicated arrow 8 at Fig. 4;

Figure 9 is an elevation view of the inner face of the gripper as taken from the indicated arrow 9 at Fig. 4, but with portions of elements being broken away to show parts otherwise hidden from view;

Figure 10 is a side elevation view of the gripper per se, similar to Fig. 4, but being released from a hand grip with elements being extended as for locking upon a ladder rung, with a sectional outline of such a rung being shown by broken lines;

Figure 11 is a sectional elevation view of the gripper as taken from the indicated line 11—11 at Fig. 8, and with broken lines indicating an intermediate position of movable elements;

Figure 12 is a fragmentary sectional detail as taken from the indicated line 12—12 at Fig. 10, but on an enlarged scale;

Figure 13 is a sectional elevation view as taken from the indicated line 13—13 at Fig. 10;

Figure 14 is a plan view of a modified construction of a ladder climbing unit comprising the gripper and a strap for attachment to a conventional safety belt to provide a modified form of the invention;

Figure 15 is a top view of a gripper unit similar to Fig. 7 but showing another embodiment thereof;

Figure 16 is an elevation view of the outer face of the modified Fig. 15 gripper, as taken from the indicated arrow 16 at Fig. 15;

Figure 17 is a sectional elevation view of the alternate gripper as taken from the indicated line 17—17 at Fig. 16, but on an enlarged scale;

Figure 18 is a fragmentary sectional elevation view as taken from the indicated line 18—18 at Fig. 16 but on an enlarged scale;

Figure 19 is a fragmentary sectional auxiliary view as taken from the indicated line 19—19 at Fig. 17;

Figure 20 is a sectional auxiliary view as taken from the indicated line 20—20 at Fig. 19, and with portions of elements being broken away to show parts otherwise hidden from view.

Safety equipment, such as safety belts to protect men working in high places has become an accepted necessity and has been extensively developed. However, corresponding safety equipment for climbing upon a ladder as to a perch, or the top of a tower or the like, has not been adequately developed, and likewise, there is no adequate safety equipment which is adapted to protect a man while working upon a ladder. Such equipment may not appear necessary to some people yet many injuries and deaths have occurred from falls while climbing and working on ladders. A long ladder climb in bad weather is especially hazardous. Also, where the climb is for a great distance up a vertical or nearly vertical ladder, such as a tower or up a permanent ladder fixed on the wall of a structure or up a mine shaft, another danger exists, for a workman may fall from sheer exhaustion or dizziness or even for some reason, faint.

The basic problem related to a ladder climbing safety apparatus is involved in the need for continually shifting the safety apparatus attachment base as the climbing progresses and this is somewhat the antithesis of conventional safety equipment where the operator securely anchors his safety rope to an anchor member in the face of the building or otherwise and leaves it there for a substantial period of time. It follows that there is a definite and real need for a shiftable type of safety apparatus which necessarily changes the ordinary concept that safety apparatus must be fixed to an anchor, to a concept that permits a safety apparatus for continual shifting from one attachment anchor to the next.

With such in view, the present invention was conceived and developed, and comprises in essence, a ladder climber, having a pair of hand-holding ladder grippers adapted to grip the rungs of the ladder as climbing progresses and with such grippers being attached to a safety belt as by connecting straps which are preferably adjustable to provide a greater latitude of activity in connection with the use of the apparatus on the ladder.

Referring more particularly to the drawing, a preferred form of a safety ladder climber is illustrated at Fig. 1. The necessary combination for providing such a ladder climber includes a safety belt B, straps S, attached to the belt, and rung grippers G, which are attached to the straps, all as hereinafter described in detail.

The belt B is basically a safety belt, conventional in many aspects of its construction and which necessarily includes a body band 20, preferably of webbing which is of sufficient length to encircle a wearer's body and sufficiently wide to provide a comfortable fit in case of a fall. This band 20 is fastened to a wearer by a conventional adjustable safety buckle 21 ordinarily at the front of the belt. The belt also preferably includes a connective D-ring 22 threaded upon the band 20 and attached at the back thereof. Conventional safety ropes and like equipment may thus be used with the belt by attachment to the D-ring providing a versatile belt construction. A protective body pad 23 lies within the body band 20 at the back of the belt and over the D-ring 22 between the ring and body of the wearer.

This belt is adapted for facile adjustable connection of the straps S thereto by a connective web 24 which extends about a substantial portion of the band 20, from each side thereof and through the D-ring 22, this web 24 being fastened to the body band 20 as by stitching 25. The web 24 is looped outwardly from each side of the body band 20 to provide strap attachment tails 26. Each loop forming a tail 26 carries a conventional buckle 27 threaded thereon and a strap S may be threaded upon each buckle 27 in a conventional manner. The loops forming these tails 26 are preferably flattened and held as by stitching 25'. To prevent ripping and tearing of the stitches 25' holding the web to the band, as when the wearer falls and places a load upon a tail 26 by the pull of the strap S in checking his fall, a ring 28 is positioned at the base of each tail to prevent the connection at the base of the tail from spreading and ripping stitches and this ring is held from slipping outwardly therefrom by an expanding filler 29 between the web portions forming the flattened tail loops.

Each strap S is connected onto one of the buckles 27 while its extended end is connected to a gripper G. The extended end of the strap S is passed through a suitable slotted opening in the gripper as hereinafter described and is doubled back upon itself to form an eye-loop 30, the loop being secured by stitching 31. A suitable reinforcing underlay 32 is placed within this eye loop to protect the strap from wear and cutting by pressure of the gripper G against the inside of the loop.

To complete the strap, the end opposite this eye may be headed, as at 33, to prevent slipping through its buckles 27 if such is desirable, or it may be finished smoothly for removal of the strap from the buckles.

The gripper G is adapted to be held by an individual with his hand in a hooked, gripping position and the gripper thus conforms to the shape of an individual's hand when he is gripping the rung of a ladder. Two embodiments of the gripper are illustrated, one embodiment G being shown at Figs. 4 and 7 to 13 and the second, G', being shown at Figs. 15 to 20. In both constructions the basic form is similar, but each provides different operating elements as hereinafter further described.

The gripper G of the Figs. 4 and 7 to 13 construction is preferably formed of light weight sheet metal having a flat trapezoidal-shaped base 34 adapted to lie against the palm of wearer's hand, and having a curved, extended end therefrom forming an arch 35 adapted to lie within the grip of the wearer's fingers. The unit is thus J-shaped in section and when held upwardly is in the form of an inverted J with the narrow edge of the trapezoidal base at the bottom end and the wide edge of the top at the arch 35. A slot 36 lies transversely in the base portion 34 and along the narrow edge opposite the arch 35 to receive the strap hereinbefore described. A thimble 37 is folded over the base along the edge of this slot within the loop 30 to reinforce the base and to further protect the underlay 32 and the strap from tearing upon the edge of the slot in the gripper. This thimble may be also formed by simply folding the blank cut from the slot against the base.

The diameter of the arch 35 is sufficient to lie over the largest rung of any ladder ordinarily used, and is sufficiently wide so that the fingers of a wearer may lie upon and over it without discomfort. This arch is folded to approximately 180 degrees with a short outward extension 38 beyond the bend which lies substantially parallel to the base portion 34. In preferred construction, a reinforcing rim 39 upstands about each side edge of the arch and is preferably formed as a double overfold by folding an edge of the flat sheet upon itself before the arch is turned and then folding the folded edge upwardly as clearly illustrated at Fig. 12. With such reinforcing rim 39 at each side of the arch it is impossible to pull and straighten out the fold forming the arch by any ordinary pull or force required to check the fall of an individual wearing the apparatus. A short outwardly turned rim 40 is formed at the outward lower edge of the extension 38 to facilitate sliding the gripper over and upon a ladder rung.

The holding surface of this gripper is relatively smooth and it is contemplated that a wearer's hand will slip if he falls and this will prevent him from holding onto a rung so tightly that he would strain himself by the pull on his arm. It is contemplated that the wearer should hold the gripper with a relatively light grasp.

There is a connecting loop 41 at the top of the gripper approximately at the position where the wearer's knuckles will lie when he is holding the gripper in the proper manner, and this loop 41 permits the wearer to keep the gripper on his hand even though he were to fully open his hand from the gripping position. This loop 41 is formed as a short pliable strap placed upon and lying across the arch 35 near the top and is attached to each rim 39 as by rivets 42 in the Figs. 7 to 13 construction. The ends of the web extend upwardly and over the gripper with one end being looped to hold a buckle 43 and with the other end being properly threaded into the buckle. Thus, the loop may be adjusted to selectively fit the hand of any individual.

The gripper includes a keeper or latch 44 which is adapted to automatically and resiliently swing outwardly from the inner face of the base 34 below the arch 35 to span the gap below the arch, as clearly shown in Figs. 10 and 11 and it follows that the latch thereby provides automatic and positive means for locking of the gripper onto the ladder rung. This is a safeguard against the gripper slipping off the rung as upon a fall of the wearer or where the wearer is using the gripper to support himself while working upon the ladder with his hands free. This latch 44 is preferably a rectangular plate which is adapted to lie flatly within a correspondingly shaped rectangular recess or socket 45 formed in the base 34, and whenever it is desired to release the gripper, a light squeeze with the hand will swing the latch into the socket 45 to be clear of movement and retract the latch completely, as clearly illustrated at Fig. 4.

The latch 44 extends through a slot 46 at the lower edge of the socket 45 to the outer face of the base with the pivot axis about which the keeper swings being at the slot. The latch portion at the outer face of the base is widened to provide hinge abutments 47 outstanding from each side thereof beyond the ends of the slot to limit the extension of the keeper into the slot and further includes, beyond hinges, a pair of spaced slots 48 near the side edges whereto the ends of springs 49 are attached to extend along each side of the socket to the arch 35 to an anchoring point hereinafter described. The pull of these springs 49 tends to hold the latch in the latching position with the abutments 47 being pushed against the base 34 at each side of the slot and with the latch being resiliently pulled to an outward rung-locking position. The latch is secured in the slot 46 by the abutments 47 at one side of the slot and by a protrusion or nub 50 in the center of the latch which may be formed by a punch or otherwise and which is adapted to lie in an orifice 51 in the face of the socket 45 when the keeper is in its retracted position.

The latch is moved and held into its retracted position in the socket 45 by the movement of a covering pressure plate 52 against the extended lower end of the widened portion 47 of the latch 44 and this latch end is suitably arched as at 53 to provide a smooth sliding contact with the pressure plate, as clearly illustrated at Fig. 11. The pressure plate functions as the result of a squeeze pressure applied by the hand of an individual as illustrated at Fig. 4. This pressure plate 52 has the same general shape as the base 34 but may be slightly smaller and includes a downwardly turned lip 54 at its bottom edge adjacent the eye loop 30 and an opposing inwardly turned lip 55 at the top edge adjacent the loop 41 to space the plate from the base 34 to a distance sufficient to provide clearance for the socket 45, springs 49 and latch arch 53 with the pressure plate 52 squeezed against the base.

The arch 53 of the latch is of such diameter that it will lie against this cover plate 52 in a position which will swing the latch 44 onto the recess when the cover plate is pushed against the base.

An arched extension 56 extends from the upper lip 55 and underneath the lower portion of the loop 41 against the arch 35 and is affixed to the loop as by rivets 57 whereby to form a hinge attachment of the pressure plate to the loop 41.

A pair of spaced holes or notches 58 is formed in the lip 55 at the edge of this extension 56 for attachment of the springs 49 therein, and the springs may be joined together as a single unit as clearly illustrated at Fig. 13.

In the embodiment illustrated at Figs. 15 to 20 inclusive, the gripper G' is substantially the same as hereinbefore described being formed as a J-shaped element having a base 34 and arch 35, an outstanding reinforcing rim 39, a slot 36 to hold the loop 30 of a strap S, and a latch 44, all the same as hereinbefore described. However, the pressure plate 52' is modified to provide for an alternate arrangement of a hinged attachment to the body of the gripper.

Also, the loop 41' is a simple strap which is not operatively connected to the pressure plate, but which is simply threaded through strap guides 60 at each side of the arch 35. These guides are formed as arcuately-shaped strips having offset feet 61 at each end thereof which are spot welded or otherwise affixed to the arch in the position as clearly illustrated in the drawing. The strap forming the loop 41' may be any conventional short, flat, easily replaceable strap, having a buckle 43 at one end.

The body of the pressure plate 52' is shaped substantially the same as hereinbefore described, and includes a lower inturned lip 54 to hold it above the socket 45 in the base 34 when the plate is pressed against the base. However, the opposing offset 55' is modified to a simple arch to conform with the arcuate section of the arch 35 and as such, it extends under the lower reach of the strap loop 41' to terminate as a hinge curl 62 with the arch 55' and hinge curl 62, being shaped to provide for holding the plate 52' above the base 34 when it is pressed against the base.

A hinge pin wire 63 extends through this curl 62 and beyond each end thereof to terminate as offset flats 64 which are welded or otherwise secured to the face of the arch 35 to pivotally secure the pressure plate 52' to the unit. The width of the hinge curl is less than the width of the pressure plate and the width of the pressure plate is less than the spacing of the strap guides with the flats 64 lying underneath each strap guide to provide for an efficient spacial arrangement of the elements associated therewith, the lower reach of the strap loop 41' thereby covering the hinge.

The connection of the spring 49 into the pressure plate 52' may be the same as heretofore described or the ends of the spring may be hooked upon the pin wire 63 at each side of the curl 62.

It follows that in the use of this apparatus, the safety belt is fastened about the wearer's waist with the straps attached to the buckles 27 and adjusted, if necessary, so that when the wearer holds the grippers he may extend his arms upwardly and outwardly a reasonable distance for easy climbing of the ladder. The climbing operation is clearly illustrated at Fig. 2, and does not differ from the conventional manner of climbing a ladder. However, instead of gripping the ladder rungs the wearer will hold the grippers and place them upon the rungs. While the wearer is holding onto the grippers the keeper 44 may be retracted and he will have no trouble in attaching and removing the grippers from the rungs. However, should he slip and fall he will ordinarily lose his grip, but the gripper will remain on the ladder rung and he will fall only the extent of the length of the strap S and his fall will then be checked. In so climbing a ladder there will always be one gripper upon a rung so that if he falls while one hand is not attached to the rung he will be safe. Where a workman desires to work upon a ladder it is necessary that he free his hands from the ladder rungs to work as illustrated at Fig. 3. The grippers are attached to selected ladder rungs and the wearer may then be free to move his hands from the grips and work efficiently and safely with both hands. Where he is apt to be upon the ladder for prolonged periods he may shorten or lengthen the straps and lock the grippers in selected rungs for better working position. The apparatus may also be used as a general safety apparatus where the operator must work upon a precarious platform and where there are horizontal pipes or the like to which he may connect the device and where he is working on a walkway which has side railings or an overhead cable or pipe.

The illustration at Fig. 14 includes a modified strap S' to which a gripper G is attached as hereinbefore described but eliminates the belt B and instead includes a latch 66 at the opposite end thereof, which may be secured onto the strap by a sewn loop 67 or may have a buckle connection thereto, not shown. This simplified unit is thereby adapted to be fastened onto a conventional safety belt of any type which has suitable rings at each side thereof or at the back for such attachment. Such a unit is especially desirable in a ladder climbing operation where, upon reaching an operating platform, the workman must use other types of safety connections and must wear conventional safety belts. Once reaching the platform, the worker may attach the other safety connectors and remove the ladder climbers until he is again ready to climb down the ladder.

While we have described many constructions and details, it is obvious that others who are skilled in the art

We claim:

1. A rung gripper for a ladder climber safety apparatus, substantially as described, adapted to be held in the hand of a wearer and to be placed over a ladder rung and comprising, a flat base adapted to fit in the palm of a wearer's hand, an arch at one end thereof adapted to fit in the grip of a wearer's fingers and about and upon a ladder rung, a latch in the base adapted to normally extend outwardly from the surface of the base and substantially across the gap at the edge of the arch in a rung-locking position and means responsive to hand pressure squeezing the gripper for retracting the latch from its extended rung-locking position.

2. The gripper defined in claim 1 wherein said latch is swingably affixed to the base and extends therethrough, including a rung-locking arm adapted to swing outwardly from the surface of the base to the rung-locking position and an opposing actuating arm adapted to swing outwardly from the opposite surface of the base and be pushed against the base by hand pressure whereby to swing said rung-locking arm against the surface of the base and means adapted to resiliently hold the latch in the outward rung-locking position.

3. A rung gripper for a ladder climber safety apparatus, substantially as described, adapted to be held in the hand of a wearer and to be placed over a ladder rung and comprising, a flat base adapted to fit in the palm of a wearer's hand, an arch at one end thereof adapted to fit in the wearer's fingers and about and upon a ladder rung, a latch swingably affixed to the base and extending therethrough including a rung-locking arm adapted to normally extend outwardly from the surface of the base and substantially across the gap at the edge of the arch in a rung-locking position and an opposing actuating arm adapted to swing outwardly from the opposite surface of the base and to be pushed against the base whereby to swing said rung-locking arm against the surface of the base, means adapted to resiliently hold the latch in the outward rung-locking position and a cover plate hingedly attached to the base and adapted to cover and contact the end of said actuating section whereby pressure of the cover plate against the actuating section moves it against the base.

4. A rung gripper for a ladder climber safety apparatus, substantially as described, adapted to be held in the hand of a wearer and to be placed over a ladder rung and comprising, a flat base adapted to fit in the palm of a wearer's hand, an arch at one end thereof adapted to fit in the wearer's fingers and upon a ladder rung, a latch swingably affixed to the base and extending therethrough including a rung-locking arm adapted to normally extend outwardly from the surface of the base and substantially across the gap at the edge of the arch in a rung-locking position and an opposing actuating arm adapted to swing outwardly from the opposite surface of the base and to be pushed against the base whereby to swing said rung-locking arm against the surface of the base, means adapted to resiliently hold the latch in the outward rung-locking position, and a strap across the arch thereof adapted to form a loop through which a wearer places his finger to facilitate holding the gripper with his fingers relaxed and a cover plate hingedly attached thereto and extending over the actuating arm.

5. A rung gripper for a ladder climber safety apparatus, substantially as described, adapted to be held in the hand of a wearer and to be placed over ladder rungs to protect the wearer's hand from contact with the rungs, and including, a flat base conformed for coaction with the palm of a human hand and an arch at one end thereof for hooked engagement with a ladder rung conformed to complement the finger grip of the hand.

6. A rung gripper for a ladder climber safety apparatus, substantially as described, and comprising a base portion conformed for coaction with the palm of a human hand, an arch at one end thereof for hooked engagement with a ladder rung conformed to complement the finger grip of the hand, a retractable latch adapted to normally extend outwardly from the surface of the base and substantially across the gap at the edge of the arch to a rung-locking position and means outstanding from the base surface opposite the latch adapted to move against the base surface and adapted to retract the latch from its extended rung-locking position responsive to the movement against the base surface.

7. The gripper defined in claim 5, including a web loop across the arch through which the wearer's fingers pass to facilitate his holding of the gripper with the grip of his fingers upon the arch being relaxed.

8. The rung gripper defined in claim 5, including outwardly turned finger retaining rims at each side of the arch.

References Cited in the file of this patent

UNITED STATES PATENTS

| | | |
|---|---|---|
| 148,744 | Parent | Mar. 17, 1874 |
| 468,574 | Moore | Feb. 9, 1892 |
| 543,464 | Brucksch | July 30, 1895 |
| 1,600,027 | Welsand | Sept. 14, 1926 |
| 1,630,484 | Fritts | May 31, 1927 |
| 1,927,469 | Plumpton | Sept. 19, 1933 |
| 1,935,339 | Tricau | Nov. 14, 1933 |
| 2,563,766 | Weinstein et al. | Aug. 7, 1951 |